US008663366B2

(12) United States Patent
Collins

(10) Patent No.: US 8,663,366 B2
(45) Date of Patent: Mar. 4, 2014

(54) DEVICE AND METHOD FOR REMOVING HUMIDITY/MOISTURE FROM A CLOSED CONTAINER OR AREA

(76) Inventor: Jeffrey Brent Collins, West Lebanon, NH (US)

( * ) Notice: Subject to any disclaimer, the term of this patent is extended or adjusted under 35 U.S.C. 154(b) by 290 days.

(21) Appl. No.: 12/886,889

(22) Filed: Sep. 21, 2010

(65) Prior Publication Data
US 2011/0265645 A1 Nov. 3, 2011

Related U.S. Application Data

(60) Provisional application No. 61/328,769, filed on Apr. 28, 2010.

(51) Int. Cl.
*B01D 53/26* (2006.01)
(52) U.S. Cl.
USPC ............................... 95/126; 96/117.5; 34/259
(58) Field of Classification Search
USPC ........ 95/117.5, 134; 96/117, 121, 126; 34/80, 34/271, 259
See application file for complete search history.

(56) References Cited

U.S. PATENT DOCUMENTS

| | | | | |
|---|---|---|---|---|
| 1,737,532 A * | 11/1929 | Allen | ............................... | 96/152 |
| 2,446,361 A * | 8/1948 | Clibbon | ............................... | 312/31.1 |
| 2,548,168 A * | 4/1951 | Luce | ............................... | 96/148 |
| 2,676,078 A * | 4/1954 | Young | ............................... | 96/148 |
| 3,035,730 A * | 5/1962 | Walker et al. | .................. | 215/228 |
| 3,246,758 A * | 4/1966 | Wagner | ............................ | 210/94 |
| 3,254,784 A * | 6/1966 | Lancesseur | ..................... | 96/148 |
| 4,146,277 A * | 3/1979 | Santoro | ........................ | 96/117.5 |
| 4,287,995 A * | 9/1981 | Moriya | ......................... | 215/228 |
| 4,350,508 A * | 9/1982 | Santoro et al. | ................ | 96/117.5 |
| 4,689,057 A * | 8/1987 | Gasper | ............................. | 96/119 |
| 4,772,300 A * | 9/1988 | Cullen et al. | ......................... | 96/7 |
| 5,191,721 A * | 3/1993 | Incorvia et al. | .................. | 34/259 |
| 6,217,639 B1 * | 4/2001 | Jackson | ........................... | 96/134 |
| 6,274,209 B1 * | 8/2001 | Pagidas et al. | ............... | 428/35.7 |
| 6,986,807 B2 * | 1/2006 | Brunk | .............................. | 96/147 |
| 2003/0205140 A1 * | 11/2003 | Flaugher et al. | ................ | 96/119 |
| 2007/0234636 A1 * | 10/2007 | Schwartz | ....................... | 43/54.1 |

* cited by examiner

*Primary Examiner* — Frank Lawrence, Jr.
(74) *Attorney, Agent, or Firm* — Dale B Halling

(57) ABSTRACT

The invention is directed to a device that removes humidity/moisture from a container or enclosed area. The device includes a plastic housing having a cavity chamber. A silica desiccant is in the cavity chamber. A color indicator indicates if the silica desiccant is active. A polyester screen/filter is heat welded to the raised circles on the bottom inside of the cavity chamber of the plastic housing. The polyester screen/filter ensures that the silica desiccant stays inside the housing even when the device is reactivated in a microwave or oven. A cover with a number of holes may be placed over the screen/filter and the screen/filter may be welded to the cover. The cover and housing may be made out of food safe polypropylene.

17 Claims, 4 Drawing Sheets

DEVICE AND METHOD FOR REMOVING HUMIDITY/MOISTURE FROM A CLOSED CONTAINER OR AREA

RELATED APPLICATIONS

The present invention claims priority on provisional patent application, Ser. No. 61/328,769, filed on Apr. 28, 2010, entitled "Dry Top/Cap & Capsule" and is hereby incorporated by reference.

STATEMENT REGARDING FEDERALLY SPONSORED RESEARCH

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING

Not Applicable

BACKGROUND OF THE INVENTION

Humidity/Moisture can be a big problem for a number of products, including dry food products, spices, dry pet foods, pharmaceutical medications, nails, tools, silverware, hearing aids and many others items. Excess humidity/moisture can cause food to spoil, medicine to weaken, nails and tools to rust/corrode and silverware to tarnish, while causing damage to many other products. There have been a number of attempts to provide devices to deal with this problem. For instance, desiccant packets or small capsules are placed in containers holding pharmaceutical pills or medication. The desiccant packets or capsules are not rechargeable. The desiccant is in a paper pouch and it is possible for the pouch or capsule to be swallowed or to break and desiccant to spill out into the container. Desiccant top/caps for containers have been proposed but they often do not keep the contents dry because the top/cap does not create a hermetically tight seal. Another problem with the previous devices to remove humidity/moisture is the desiccant is active while the device is in storage and by the time it gets to the user, it cannot remove any additional moisture. One attempt to solve this includes a complex bimetallic valve that only opens when a top/cap is placed on a container.

Thus, there exists a need for an easy to use product that can regulate the humidity/moisture of storage spaces, is rechargeable, hermetically sealed, does not break open, and is active when received by the customer.

BRIEF SUMMARY OF INVENTION

A device that overcomes these and other problems includes a plastic housing having a cavity chamber. A silica desiccant is in the cavity chamber. A color indicator indicates if the silica gel desiccant is active. The silica gel is categorized as food grade. A polyester screen/filter is placed at the bottom of the cavity chamber within the plastic housing top/cap. The polyester screen/filter ensures that the silica desiccant stays inside the housing top/cap even when the device is recharged in a microwave or oven. At the bottom of the cavity chamber within the top/cap are a number of holes with raised plastic circle around these holes that the screen/filter is placed on and then may be heat welded to the bottom of the cavity chamber. The top/cap housing may be made out of Polypropylene. Polypropylene is categorized as food grade plastic by the Food and Drug Administration. The user can tell if the device is no longer capable of removing humidity when the color indicator turns a dark green, meaning it is deactivated. The device can be reactivated by placing it in the microwave at a high temperature for a predetermined period of time. Alternatively, the device can be reactivated by placing it in an oven at a predetermined temperature for a predetermined period of time. The devices are shipped with a clear plastic film seal over the holes to ensure the desiccant does not become inactivated in shipping or while on the shelf. When the device is in the form of a cap, the cap and the container together create a hermetic seal. This is accomplished in one case by three separate seals between the container rim and the cap.

DETAILED DESCRIPTION OF THE INVENTION

The invention is directed to a device that removes humidity/moisture from a container or enclosed area. The device includes a plastic housing having a cavity chamber. A silica desiccant is placed the cavity chamber. A color indicator indicates if the silica desiccant is active. A polyester screen/filter covers the holes at the bottom cavity of the cavity chamber within the plastic housing. The polyester screen/filter ensures that the silica desiccant stays within the cavity chamber. At the bottom of the cavity chamber within the top/cap are a number of holes. The bottom also has a number of raised plastic circles that the screen is placed on and screen may be heat welded to the bottom of the cavity chamber. This is done to also make sure that the screen/filter does not move, causing the silica gel to escape by moving around the screen/filter. The top/cap housing may be made out of Polypropylene. Polypropylene is categorized as food grade plastic by the Food and Drug Administration. The user can tell if the device is no longer capable of removing humidity/moisture when the color indicator turns a dark green. The device can be recharged by placing it in the microwave at a high temperature, for a predetermined period of time. Alternatively, the device can be reactivated by placing it in an oven at a predetermined temperature for a predetermined period of time. The devices are shipped with a clear plastic film seal over the cover to ensure the desiccant does not become deactivated in shipping or while on the shelf. When the device is in the form of a cap, the cap and the container together create a hermetic seal. This is accomplished in one case by three separate seals between the container rim and the top/cap.

Figure 1:
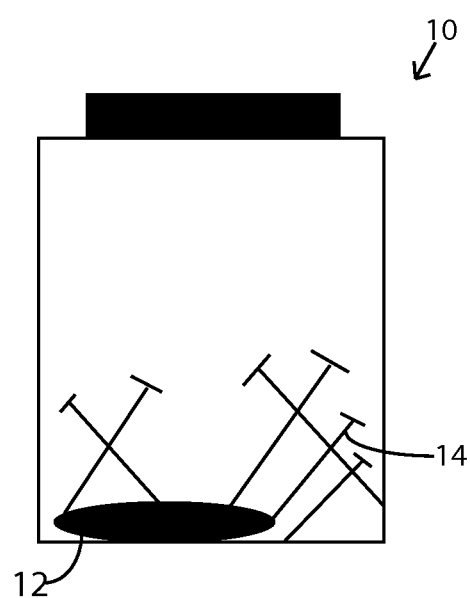
FIG. 1 is a front view of a container with a device for removing humidity/moisture from the container in accordance with one embodiment of the invention.

FIG. 1 is a front view of a container 10 with a device 12 for removing humidity from the container 10 in accordance with one embodiment of the invention. The container 10 is shown holding nails 14. The desiccant capsule 12 is placed in the same container 10 as the nails to keep them from rusting/corroding. It may also be used for other items to avoid spoiling, mildew, molding or just the braking down of item because of humidity/moisture. The container or enclosed areas could also hold dry food products (human or animal), such as nuts or crackers, or medications, or tools, or prevent silverware from tarnishing. The desiccant capsule 12 ensures that the environment inside the container stays dry.

Figure 2:
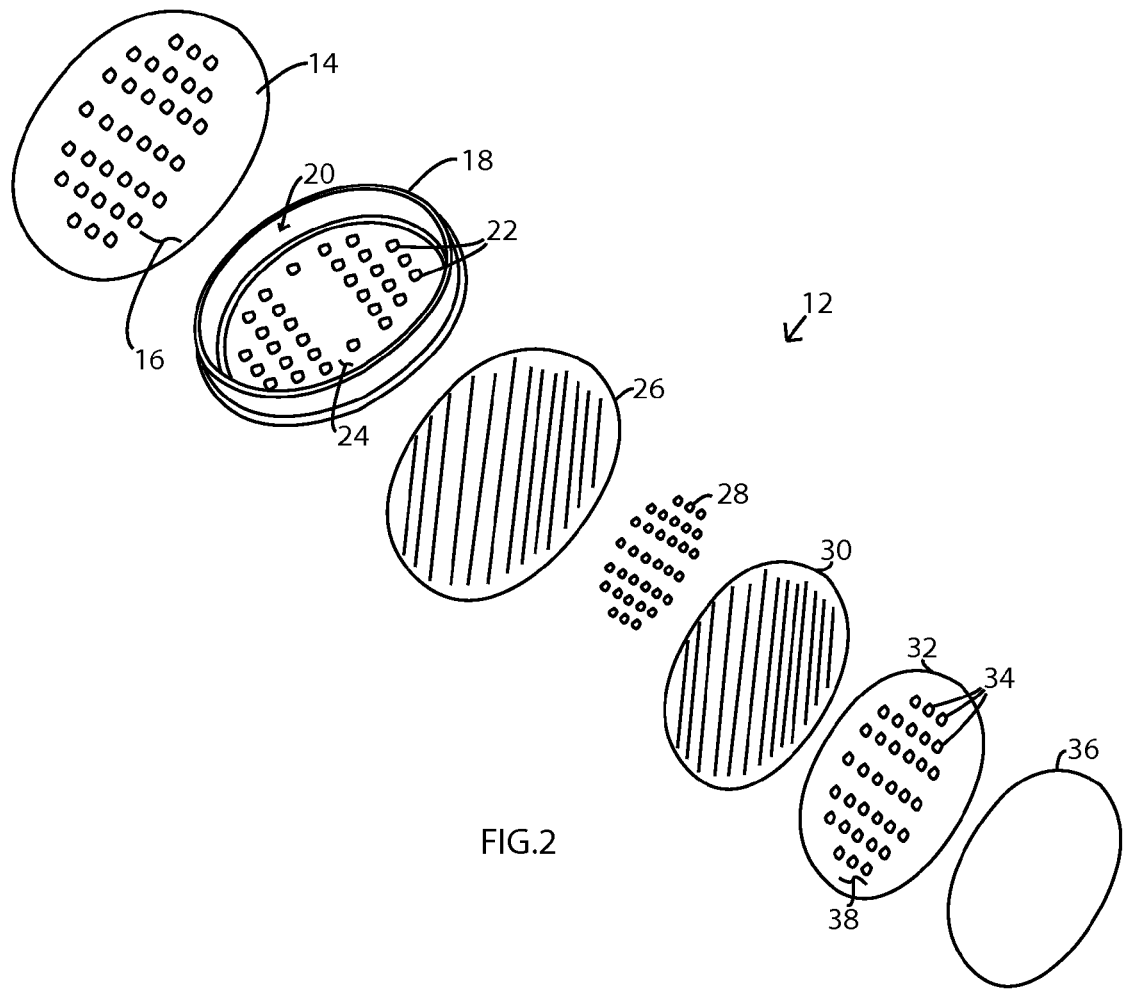
FIG. 2 is an exploded view of a capsule for removing humidity/moisture from a container in accordance with one embodiment of the invention.

FIG. 2 is an exploded view of a capsule 12 for removing humidity/moisture from a container or enclosed area in accordance with one embodiment of the invention. The capsule 12 has a clear film seal 14 that may contain an adhesive on one side 16 to adhere to the outside of a housing 18 covering the holes. The housing 18 has a cavity chamber 20. In this embodiment, the housing 18 is a disk shaped cup that defines an interior space or cavity chamber 20. In this embodiment the housing 18 has a plurality of holes 22 in an end wall 24. A screen/filter 26 is placed 24 of the housing 18. In one embodiment, the screen/filter 26 is made of categorized food grade polyester. In another embodiment, the screen/filter 26 is made of any material that is microwave safe and can withstand boiling water. This polyester screen/filter is place on the raised plastic circles/holes and heat welded onto the inside capsule end walls. Next, a silica gel and color indicator 28 is placed in the capsule cavity within the plastic housing 18 cavity chamber 20. Commonly the silica gel 28 is in the form of grains. The color indicator is orange when the silica gel 28 is activated and changes to a dark green when it is in a deactivated state. The color indicator and silica gel used in these devises does not contain cobalt chloride. The silica gel is mainly silicon dioxide and is in the category of food safe. A second screen/filter 30 is placed against an inside end wall with the holes of a cover 32 and is also heat welded to the raised circles within the inside cover. The cover 32 has a plurality of holes 34. A clear cover 36 is placed over the holes on the face 38 of the cover 32. The housing 18 and the cover 32 are made of microwavable plastic. In one embodiment, the plastic is a food grade plastic that can withstand heat of at least the boiling temperature of water. In one embodiment, the plastic is a polypropylene. In one embodiment, the cover 32 is adhered to the housing 18. In another embodiment, the cover 32 is heat welded to the plastic housing 18. In one embodiment, the screen/filter 26 is heat welded or otherwise adhered to the housing 18. The housing 18 may contain weld bumps including circles to facilitate the attachment of the housing 18 to the screen. Similarly the screen/filter 30 is welded or otherwise adhered to the cover 32 and the cover may contain weld bumps.

In operation, the user will remove the clear film plastic seals 14 and 36 from the capsule 12. The capsule 12 is then placed in a container along with the item the user wishes to keep humidity/moisture free. This may include foodstuffs, medication, chemicals, instruments, gun vaults, tools, hearing aids, etc. The plastic film seals 14 & 36 ensure that the silica gel 28 is activated until needed, which means it will stay orange in color. When the customer sees that the silica gel has changed to a dark green color then they know the silica gel needs to be reactivated. This can be accomplished by placing the device in the microwave or the oven. If the customer uses a microwave, the device is placed in the microwave and the microwave is set to high power and heated for a predetermined period of time. The time period varies based on the specific embodiment of the device. For instance, larger devices will require a longer period of time. A common sized device will take forty five seconds. If the customer uses the oven to reactivate the device, the oven is set to a predetermined temperature and the device is heated for a predetermined period of time. The time period varies based on the specific embodiment of the device. In one embodiment, the oven is preheated to a temperature of 250 degrees Fahrenheit and the device is placed in the oven for one hour. When the device has been reactivated the silica gel will go back to its original orange again.

Figure 3:
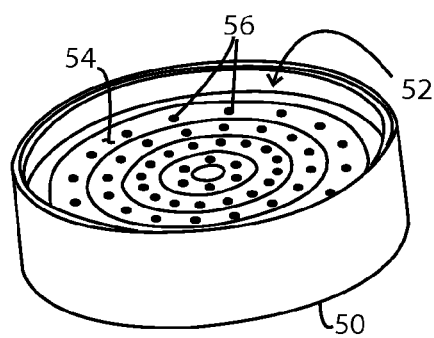
FIG. 3 is a left perspective view of part of a cap for removing humidity from a container in accordance with one embodiment of the invention.

FIG. 3 is a top left perspective view of part of a top/cap 50 for removing humidity/moisture from a container in accordance with one embodiment of the invention. The top/cap 50 forms a housing with a cavity chamber 52. A food grade polyester screen/filter like the one shown in FIG. 2 is placed on the bottom of cavity chamber. Silica gel with a color indicator is placed in the top/cap cavity chamber. The inside wall 54 of the cavity chamber bottom 52 has a plurality of holes 56 to allow moisture to move freely from the container into the silica gel.

Figure 4:
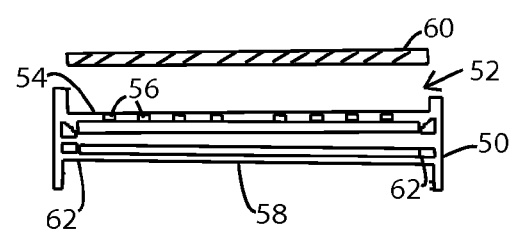
FIG. 4 is a cross sectional view of the cap in FIG. 3 in accordance with one embodiment of the invention.

FIG. 4 is a cross sectional view the cap 50 in FIG. 3 in accordance with one embodiment of the invention. The cap 50 has an internal threading 58 for mating with a container. A screen/filter like the ones shown in FIG. 2 is placed next to wall 54. Then silica gel similar to that shown in FIG. 2 is placed in the cavity 52. A cover 60 then fits over the cavity 52. A plastic seal similar to that shown in FIG. 2 may be placed over the non-cavity face of wall 54. The cap 50 includes a hermetic seal protrusion 62, which will be explained in more detail with respect to FIG. 6.

Figure 5:
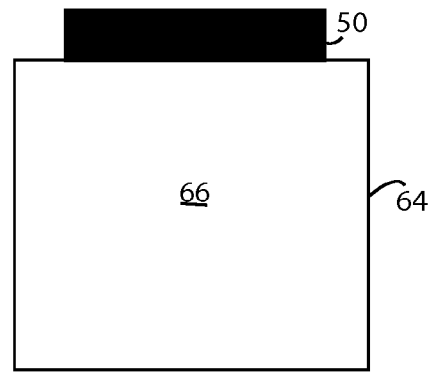
FIG. 5 is front view of a container with a cap for removing humidity/moisture in accordance with one embodiment of the invention.

FIG. 5 is front view of a container 64 with a top/cap 50 for removing humidity in accordance with one embodiment of the invention. The holes 56 allow access to the interior 66 of the container 64. As a result, humidity/moisture within in the container is absorbed by the silica gel in the top/cap 50.

Figure 6:
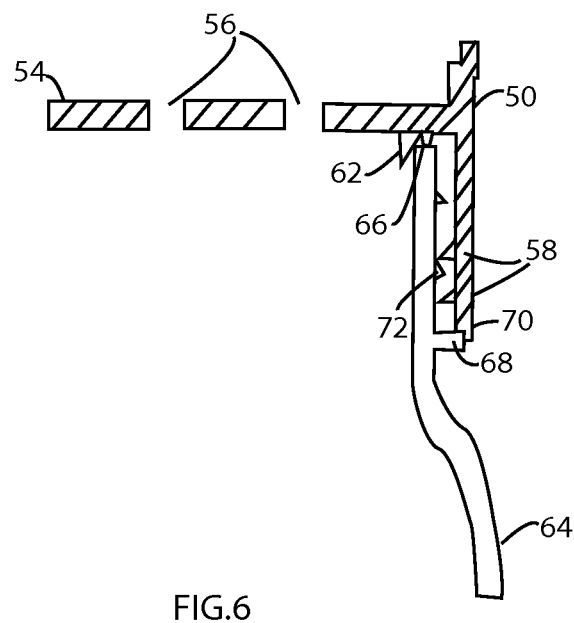
FIG. 6 is a partial cross sectional view of the top/cap and the container in accordance with one embodiment of the invention.

FIG. 6 is a partial cross sectional view of the top/cap 50 and the container in accordance with one embodiment of the invention. This figure shows how a hermitic seal is created between the top/cap 50 and the container 64. A protrusion 62 engages two locations for two seals at the lip 66 of the container 64 to form two independent seals. A lip 68 of the container 64 engages a notch 70 in the top/cap 50 to form a third seal. The threads 58 of the top/cap engage the threading 72 of the container 64. This triple seal ensures that a hermetic seal is formed between the top/cap and the container 64.

Thus there has been described a device that is easy to use, regulates the humidity/moisture for dry storage spaces within a container or other enclosed areas, is rechargeable, hermetically sealed, made of hard plastic and does not break open, and is active by a pull off clear seal when received by the customer.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A device for removing humidity/moisture from a container, or enclosed areas comprising:
   a plastic housing having a cavity chamber having an end wall with a plurality of holes;
   a silica desiccant in the cavity chamber, wherein the silica desiccant is food grade;

a color indicator indicating if the silica desiccant is active;

a polyester screen covering the end wall of the cavity chamber of the plastic housing, wherein the polyester screen is food grade; and a cover covering the cavity chamber, wherein the cover is a microwave safe material;

whereby an enclosed space of the container is kept free of excessive moisture.

2. The device of claim 1, wherein the plastic housing includes a threading.

3. The device of claim 2, wherein the plastic housing forms a hermetic seal with the container.

4. The device of claim 1, wherein the cover has a plurality of holes.

5. The device of claim 1, wherein the cover is welded to the polyester screen.

6. The device of claim 1, wherein the plastic housing is made of polypropylene plastic.

7. The device of claim 1, wherein the device is rechargeable by a microwave oven.

8. The device of claim 5, wherein the cover is made of polypropylene plastic.

9. The device of claim 4, further including a seal over the cover.

10. A method of removing humidity/moisture from a container, comprising the steps of:

removing a plastic seal from a plastic housing containing a desiccant;

checking a color of the desiccant in the plastic housing, wherein the desiccant is food grade;

when the color of the desiccant is orange, placing the plastic housing in contact with an interior of the container; and sealing the container;

wherein the interior of the sealed container is kept free of excessive moisture.

11. The method of claim 10, further including the steps of:

when the color of the desiccant in the housing is a dark green, placing the housing in a microwave to reactivate the desiccant;

when the desiccant is reactivated, placing the housing in contact with the interior of the container.

12. The method of claim 11, wherein the step of placing the desiccant in the microwave, includes the step of heating the housing for a predetermined period of time.

13. The method of claim 10, further including the steps of:

when the color of the desiccant in the housing is a dark green, placing the housing in an oven to reactivate the desiccant;

when the desiccant is recharged, placing the housing in contact with the interior of the container.

14. The method of claim 13, wherein the step of placing the desiccant in the oven, includes the step of heating the housing for a predetermined period of time.

15. The method of claim 14, further including the step of setting the oven to a predetermined temperature.

16. A device for removing humidity/moisture from a container, comprising:

a plastic housing having a cavity chamber having an end wall with a plurality of holes, wherein the housing is made of polypropylene;

a screen adjacent to the end wall in the cavity chamber in the housing, wherein the screen is made of polyester and the polyester is food grade;

a desiccant in the cavity chamber adjacent to the screen, wherein the desiccant is food grade; and a cover over the cavity chamber, wherein the device is microwave safe and a clear removable seal over the housing;

wherein the device is microwave rechargeable;

wherein the device is safe for food containers;

wherein the device continues to remove humidity from the air in an essentially air tight container whenever a lid of the container is removed and replaced.

17. The device of claim 16, wherein the housing forms a plurality of seals when attached to the container, wherein the housing has a protrusion that engages the lip of the container, and the container has a second lip that engages a notch in the housing.

* * * * *